No. 734,405. PATENTED JULY 21, 1903.
S. S. CUDD.
FERTILIZER DISTRIBUTER AND SEED DROPPER.
APPLICATION FILED AUG. 5, 1902.
NO MODEL.
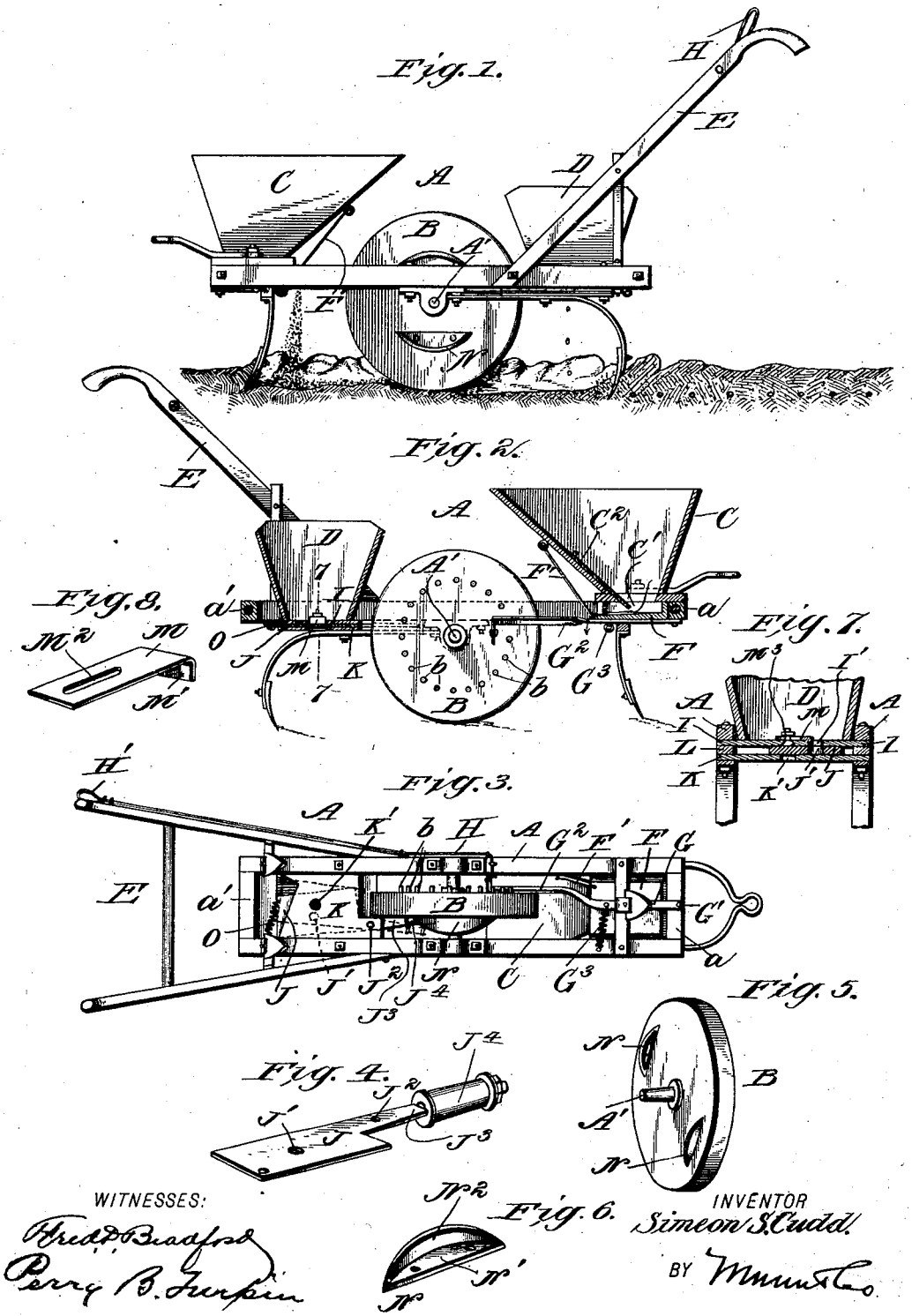
WITNESSES:
INVENTOR
Simeon S. Cudd
BY
ATTORNEYS.

No. 734,405. Patented July 21, 1903.

UNITED STATES PATENT OFFICE.

SIMEON S. CUDD, OF KELTON, SOUTH CAROLINA, ASSIGNOR TO SAMUEL J. H. HOWELL, OF KELTON, SOUTH CAROLINA.

FERTILIZER-DISTRIBUTER AND SEED-DROPPER.

SPECIFICATION forming part of Letters Patent No. 734,405, dated July 21, 1903.

Application filed August 5, 1902. Serial No. 118,461. (No model.)

*To all whom it may concern:*

Be it known that I, SIMEON S. CUDD, a citizen of the United States, residing at Kelton, in the county of Union and State of South Carolina, have made certain new and useful Improvements in Fertilizer-Distributers and Seed-Droppers, of which the following is a specification.

My invention is an improvement in fertilizer-distributers and seed-droppers and has for an object to provide a machine which is especially adapted for planting corn, peas, and the like; and the invention consists in certain novel constructions and combinations of parts, as will be hereinafter described and claimed.

In the drawings, Figure 1 is a side elevation of my invention as in use. Fig. 2 is a vertical longitudinal section thereof. Fig. 3 is a bottom plan view of the machine. Fig. 4 is a detail view of the seed-dropping plate. Fig. 5 is a detail perspective view of the operating-wheel. Fig. 6 is a detail perspective view of one of the cam-plates for said wheel. Fig. 7 is a vertical cross-section on about line 7 7 of Fig. 2, and Fig. 8 is a detail perspective view of the gage-plate.

In carrying out my invention I employ a suitable frame including side beams A, to which is journaled at A' the operating-wheel B and upon which are supported the fertilizer-box C and the seedbox D at respectively the front and rear ends of the frame, said beams A being connected at their front and rear ends by the cross-bars $a$ and $a'$, as shown in Figs. 2 and 3. Handles E connect with the main frame and extend upwardly and rearwardly, as shown in Figs. 1 and 2.

The fertilizer-box C has a discharge-opening C' leading to the shaking discharge box or tray F, which is supported on a strap G, pivoted at its front end at G' to the cross-bar $a$, extending thence beneath the shaking-box F, to which it is secured, and projecting rearwardly beyond the said shaking-box and having its rear portion $G^2$ inclined to the vertical, as will be understood from Figs. 2 and 3, so it will be engaged by the pins $b$ of the operating-wheel B and moved in one direction, a spring $G^3$ being arranged to readjust the bar G and the shaking discharge-box F, and the latter being supported at its rear end by the hanger F', (see Figs. 1, 2, and 3,) so it can freely oscillate from side to side, and thus secure the discharge of the fertilizer at the rear end of the box. A gage-plate $C^2$ is slidably supported within the fertilizer-box C, so it can be adjusted toward and from the shaking discharge-box F to regulate the amount of fertilizer discharged. When it is not desired to feed the fertilizer, the bar G may be pulled to one side by the pull cord or rod H, extending at H' adjacent to one of the handles E.

The seedbox D is open at its bottom and rests upon the bottom plate I, which is secured at its opposite edges to the beam A, (see Fig. 7,) and is provided with a discharge-opening I', which registers in the position of parts shown in Fig. 7 with the dropping-opening J' in the dropping-plate J. The plate J operates between the plate I and a lower plate K, which latter is provided with a dropping-opening K', out of line with the opening I', and is secured below the plate I by the same bolts which hold said plate I to the beam A, spacing-blocks L being arranged between the upper and lower plates I and K to space the same properly apart to permit the operation between them of the dropping-plate J, as best shown in Fig. 7. In operation the plate J is rocked from the position shown in Fig. 7 to a position in which its opening J' will register with the opening K' in the lower plate K, and in such manner the seeds will be taken by the dropping-plate when delivered from the opening I' and discharged through the opening K'. A gage-plate M has a depending portion M' projecting within the opening I', and this gage-plate may preferably be provided with the slot $M^2$, through which its fastening-bolt $M^3$ passes, so the gage-plate can be adjusted to vary the capacity of the discharge-opening I', and thus regulate the amount of seed dropped by the machine. The dropping-plate J is pivoted at $J^2$ and is provided with the forwardly-projecting arm or portion $J^3$, which extends along the side of the operating-wheel opposite that from which the pins $b$ project. This arm $J^3$ is operated by cams N on the operating-wheel engaging the roller $J^4$, said cams being preferably formed with the base-plates N' lapped against and secured to the operating-wheel and the curved portions N², which engage with the arm J³ of the dropping-plate. A spring O engages with the dropping-plate to retract the same after its operation by the cam N, as will be understood from Fig 3 of the drawings.

Having thus described my invention, what I claim as new, and desire to secure by Letters Patent, is—

The improvement herein described consisting of the supporting-frame, the operating-wheel having a cam N, the seedbox, the bottom plate of the seedbox having the discharge-opening, the dropping-plate pivoted between its ends and extending at its front end alongside the operating-wheel in position for operation by the cam thereon and arranged at its rear end below the bottom plate and having an opening movable into and out of register with that of the bottom plate, and a lower or discharge plate arranged between the bottom plate and dropping-plate and having a discharge-opening out of line with that in the bottom plate and in position to be registered by the opening in the dropping-plate, in one position of the said plate, substantially as and for the purpose set forth.

SIMEON S. CUDD.

Witnesses:
J. W. GREGORY,
C. H. PEAKE.